Apr. 10, 1923. 1,451,389
T. W. GRANNAN ET AL
INTERNAL COMBUSTION ENGINE
Filed June 3, 1921 5 sheets-sheet 1

Witnesses:
S. H. Harrington
S. R. Bell

Inventors
THOMAS W. GRANNAN
WILLIAM D. GRANNAN,
by J. Howden Bell
Attorney

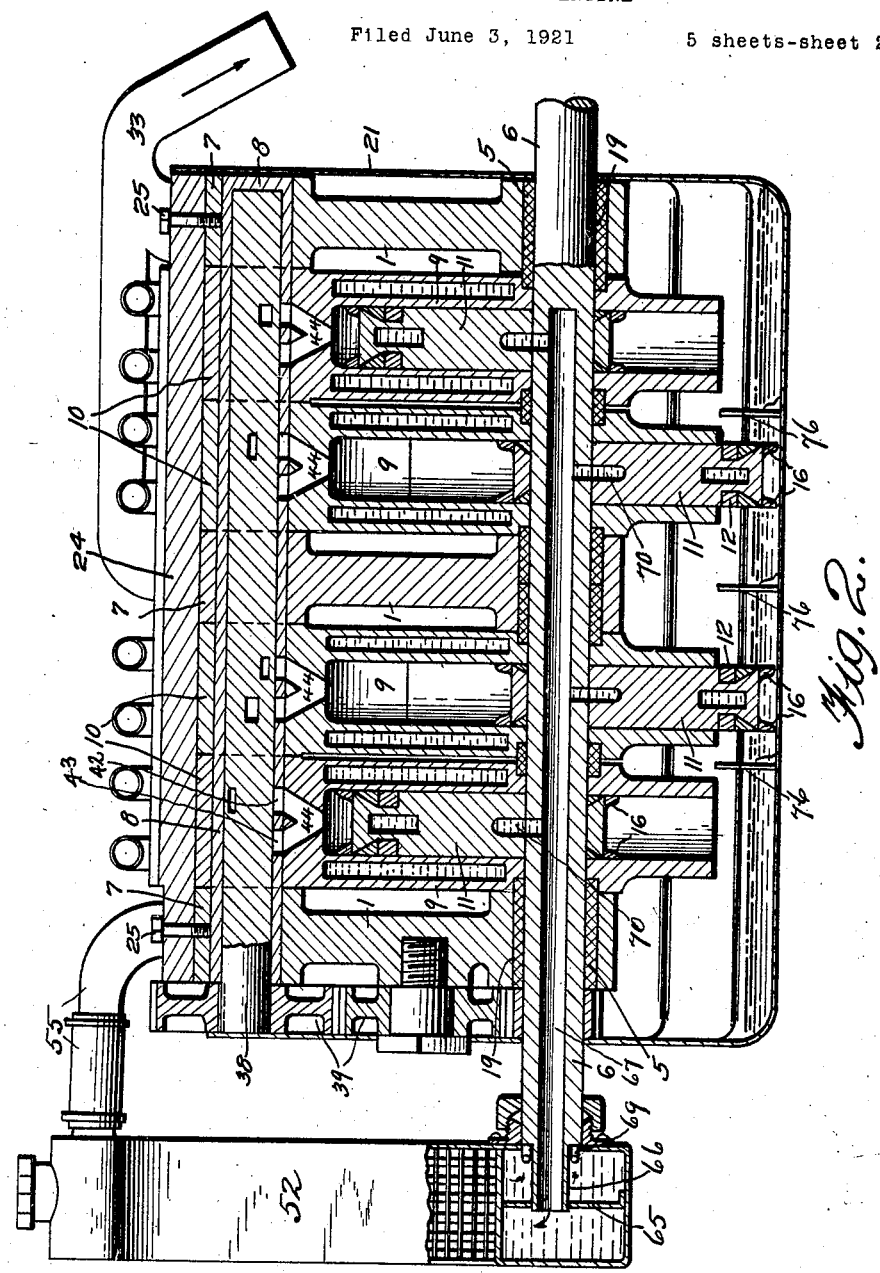

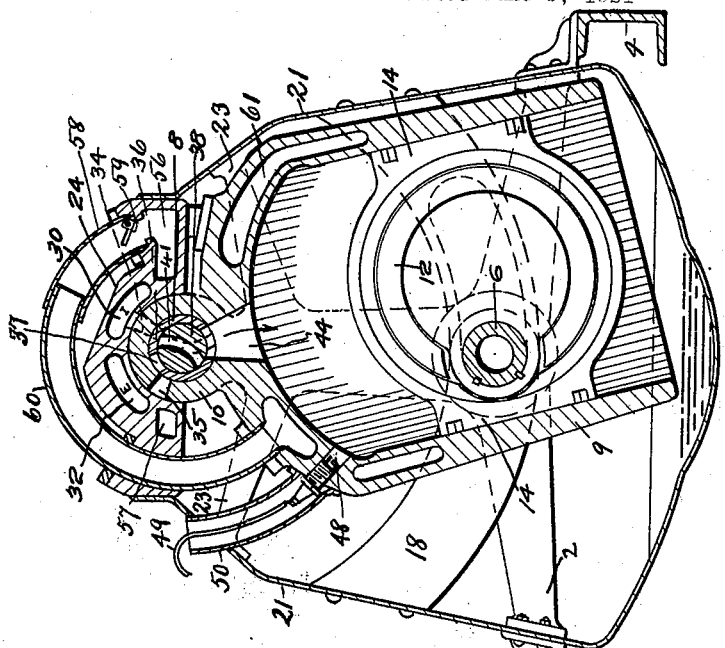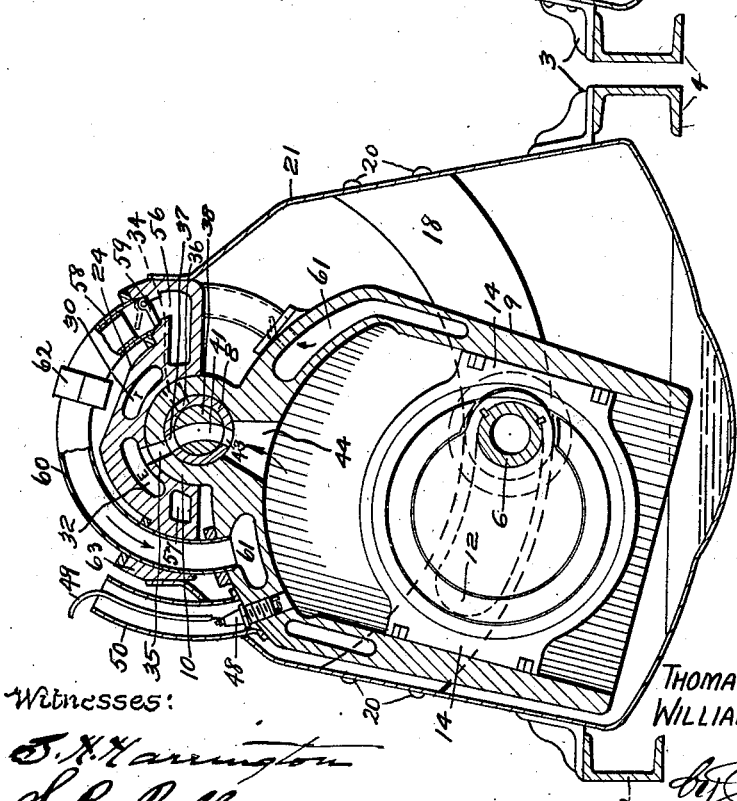

Apr. 10, 1923.
T. W. GRANNAN ET AL
INTERNAL COMBUSTION ENGINE
Filed June 3, 1921
1,451,389
5 sheets-sheet 4
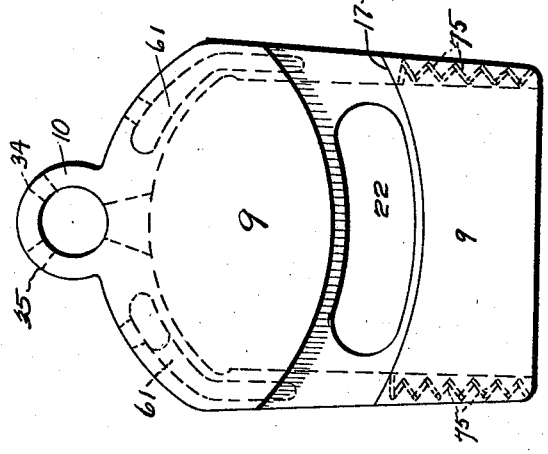
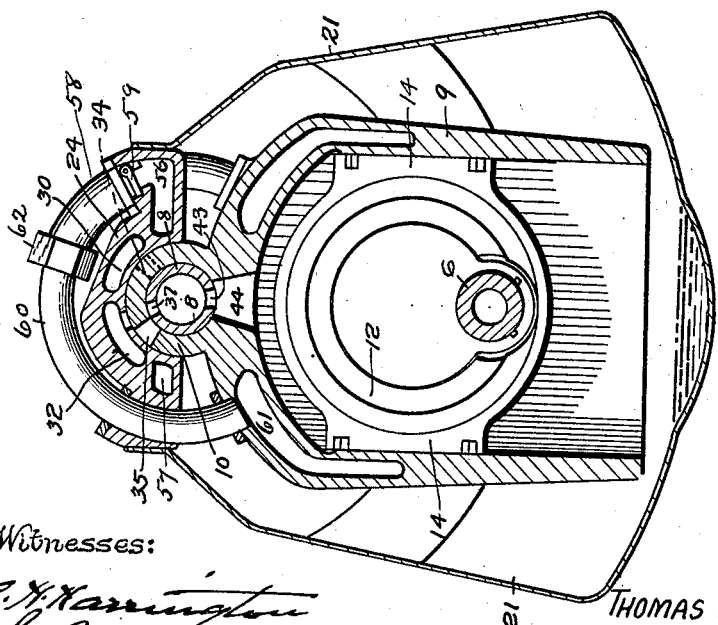
Witnesses:
Inventor
THOMAS W. GRANNAN
WILLIAM D. GRANNAN,
Attorney Apr. 10, 1923.

T. W. GRANNAN ET AL 1,451,389

INTERNAL COMBUSTION ENGINE

Filed June 3, 1921

5 sheets-sheet 5

Witnesses:

Inventors
THOMAS W. GRANNAN
WILLIAM D. GRANNAN,

Attorney

Patented Apr. 10, 1923.

1,451,389

UNITED STATES PATENT OFFICE.

THOMAS W. GRANNAN AND WILLIAM D. GRANNAN, OF LOOGOOTEE, INDIANA.

INTERNAL-COMBUSTION ENGINE.

Application filed June 3, 1921. Serial No. 474,634.

*To all whom it may concern:*

Be it known that we, THOMAS W. GRANNAN and WILLIAM D. GRANNAN, both citizens of the United States, and residents of Loogootee, in the county of Martin and State of Indiana, have jointly invented a certain new and useful Improvement in Internal-Combustion Engines, of which improvement the following is a specification.

Our invention relates to internal combustion engines, adapted for use as prime movers in automobiles, motor boats, aeroplanes, etc., and its object is to provide an engine of such type which shall be of simplified, inexpensive, light, and substantial construction; shall occupy less space, relative to its power, than those of the ordinary construction; and shall, in operation, effect a material reduction of vibration and wear of moving parts, with a corresponding reduction of maintenance costs and delays for renewals or repairs.

The leading and characteristic feature of our invention, stated in general terms, consists in the substitution for the ordinary cylinders, reciprocating pistons, connecting rods, and cranked driving shaft, of chambers of oblong cross section, which will herein be descriptively termed "cylinders," because performing the function of the ordinary circular bore cylinders, said chambers being mounted to oscillate about a fixed sleeve, in which rotates a ported shaft constituting the inlet and outlet valves for the chambers, said cylinders being supported and guided by segmental guides carried by the frame, and an eccentric disc, working in each chamber, said discs constituting, with shoes carried by them and sliding on the end walls of the chambers, the pistons of the engine, the eccentrics being mounted on a straight driving shaft, which passes through curved slots in the side walls of the chambers.

Another feature of our invention consists in the water cooling systems provided, one of which is for cooling the oscillating chambers, and the other for cooling the eccentrics and the driving shaft.

The improvement claimed is hereinafter fully set forth.

Figure 1:
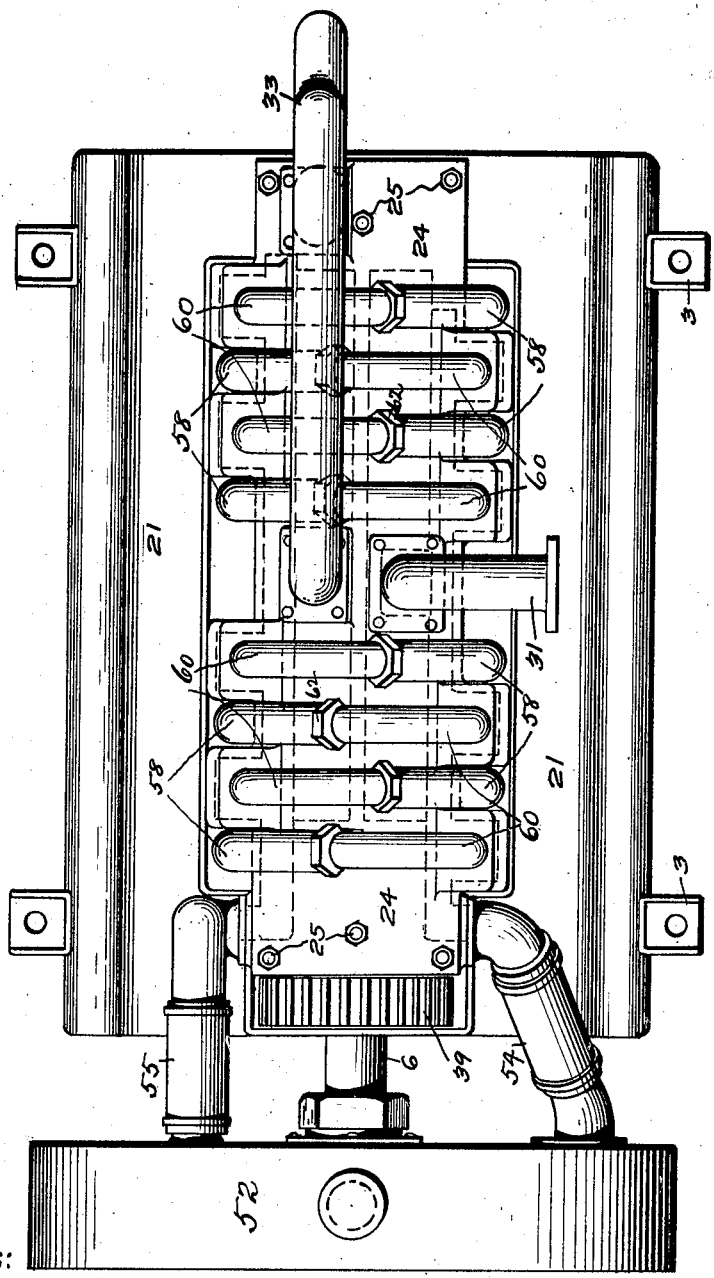
Figure 8:
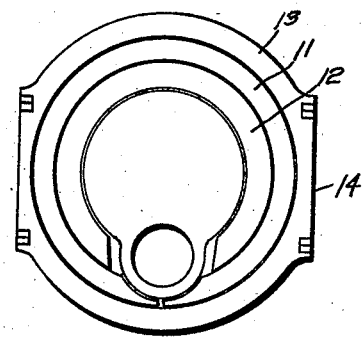
Figure 9:
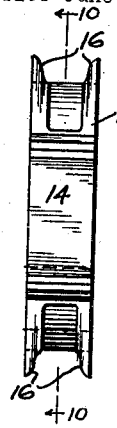
Figure 10:
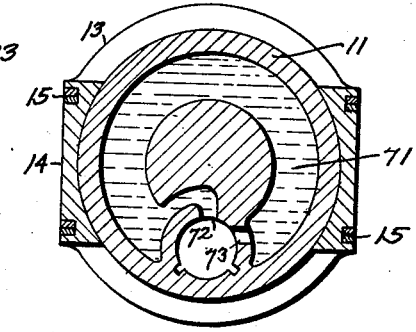
Figure 11:
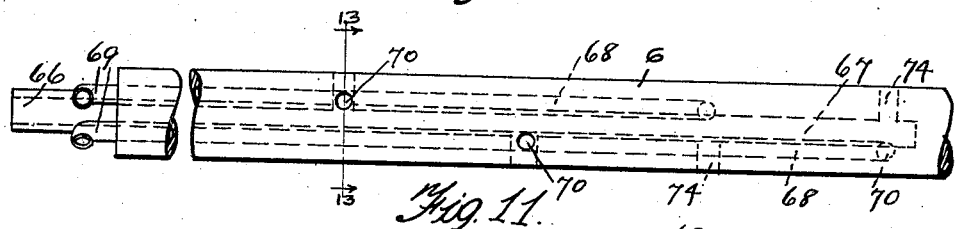
Figure 12:
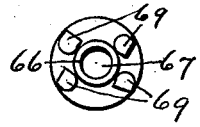
Figure 13:
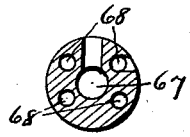
Figure 14:
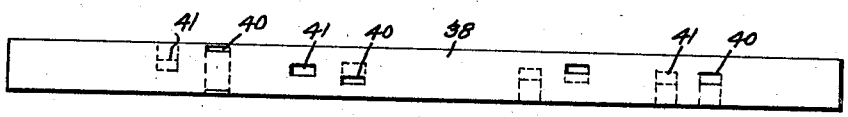

In the accompanying drawings: Figure 1 is a plan or top view of a four cylinder internal combustion engine, embodying our invention; Fig. 2, a vertical longitudinal central section through the same; Fig. 3, a vertical transverse section through one of the cylinders, showing it in the position occupied when the exhaust ports are open; Fig. 4, a similar section, showing the cylinder in the position occupied when the admission ports are open; Fig. 5, a similar view, showing the cylinder in its dead centre position; Fig. 6, a side view, in elevation, of one of the cylinders; Fig. 7, an end view of the same; Fig. 8, a side view of one of the eccentric pistons; Fig. 9, an end view of the same; Fig. 10, a vertical section through the same; Fig. 11, a side view, in elevation, of the driving shaft; Fig. 12, an end view of the same; Fig. 13, a transverse section through the same; and, Fig. 14, a side view, in elevation, of the valve shaft.

In the practice of our invention, referring descriptively to the specific embodiment thereof which is herein exemplified, we provide a supporting frame, comprising a plurality of vertical members, 1, each having a pair of arms, 2, projecting laterally from it, at its bottom, and a pair of similarly projecting arms, 23, adjacent to its top. The ends of the lower arms, 2, are secured, as by angle castings, 3, to a bed plate or base, 4, which may be part of the framework of a motor vehicle, boat, or aeroplane. Bearings, 5, for a driving shaft, 6, are formed in the lower ends of the vertical members, 1, and cylindrical bosses, 7, are formed on their upper ends, and are bored out to receive a sleeve, 8, which is fitted in them, without capacity of rotation. The cylinders, 9, which are disposed in pairs between the vertical members, 1, of the frame, are oblong in transverse section, their longer dimension being at a right angle to the axes of the driving shaft, 6, and sleeve, 8, and cylindrical bosses, 10, are formed in the tops of their heads, said bosses being bored out to rotatably fit on the sleeve, 8, between the bosses, 7, of the frame, as shown in Fig. 2.

An eccentric disc piston, 11, is keyed on the driving shaft, 6, within each of the cylinders, 9, said disc pistons being provided with packing rings, 12, by means of which a gas tight fit is formed between them and the sides of the cylinders in which they are located. Each piston disc is surrounded by a strap or yoke, 13, on the opposite sides of which, shoes, 14, are formed, which fit against the end walls of the cylinder, and are provided with packing strips, 15, thereby completing the fit of the pistons in the cylinders. The portions of the straps between the shoes are cut away, so as to leave the major portion of the discs exposed to the pressure of the gases, as shown in Fig. 10.

In a four cylinder engine, which type is herein exemplified, the two inner eccentrics are set at 180 degrees from the two outer ones, from which it follows that adjacent cylinders oscillate alternately, that is, in opposite directions at each stroke. To guide the cylinders in their swinging movements, and to take their weight off the sleeve, 8, about the axis of which they swing, segmental guide-ways, 17, are formed in the outer faces of the sides of the cylinders, which slide on similarly curved guides, 18, supported between the members of each pair of adjacent cylinders, and at the ends. The two outside guides, 18, have laterally projecting central hubs, 19, which constitute the bearings, 5, for the driving shaft, in the two outer housings. The intermediate guides, 18, are extended and secured at their ends, as by rivets, 20, to the casing, 21, which encloses all the moving parts of the engine, and the lower part of which constitutes an oil reservoir, into which the corners of the cylinders dip as they oscillate. The sides of the cylinders are provided with segmental slots, 22, through which the driving shaft passes. The vertical members, 1, of the frame, have upper lateral arms, 23, to which the casing, 21, is secured, as shown in Fig. 4.

A cored cast-iron cap, 24, fits on, and is detachably secured to, the bosses, 7, of the vertical members of the frame, as by bolts, 25, and, between said members, fits snugly over the bosses, 10, of the cylinders. Said cap constitutes the manifold for the incoming and exhaust gases, and is also provided with passages for the water entering and leaving the cylinder jackets, as will hereinafter be described in detail. A passage, 30, receives the gas introduced into it by the inlet pipe, 31, and an outlet passage, 32, leads to the exhaust pipe, 33. Said passages come into communication, in the oscillation of the cylinders, with ports, 34 and 35, respectively, formed in the cylindrical bosses, 10, of the cylinders. Within said bosses, the fixed sleeve, 8, is provided with similar inlet and outlet ports, 36 and 37, which communicate, at the proper times, with the ports, 34 and 35. Within the sleeve, 8, there is located the rotary valve shaft, 38, which is driven, in timed relation to the driving shaft, by the train of reducing gearing, 39. The valve shaft is provided with curved inlet and outlet passages, 40 and 41, which, in the rotation of said shaft, serve to alternately put into communication the ports, 36 and 37, in the upper half of the sleeve, with the corresponding ports, 42 and 43, in the lower half of the same, said last mentioned ports leading into the common inlet and outlet passage, 44, in the head of the cylinder.

Each cylinder is provided with suitable means to ignite the combustible mixture at the proper time, such as the spark plug, 48. The wires, 49, leading to the plug, are enclosed in a curved pipe, 50, concentric with the pivotal axis of the cylinders and working in an aperture formed for it in the casing, 21.

As before stated, the engine is equipped with a water cooling system, one part of which cools the water jackets of the cylinders, and the other the driving shaft and the eccentrics. Both parts of the system are connected to the usual radiator, 52, between which and the front of the engine, there may be mounted the usual fan, not shown.

Referring first to that part of the cooling system which takes care of the oscillating cylinders, an inlet pipe, 54, extends from the lower part of the radiator, 52, to the cap, 24, and an outlet pipe, 55, extends from said cap back to the radiator. These pipes communicate with cored passages, 56, and 57, respectively, in said cap. The passage, 56, has an open mouth, around which is secured the end of a short curved pipe, 58, provided with a check valve, 59, at its mouth. A similarly curved pipe, 60, of sufficiently smaller diameter to telescope in the pipe, 58, is secured to the open mouth of the water passage, 61, which forms part of the water jacket surrounding each cylinder. A packing nut or collar, 62, surrounds the telescoping ends of the pipes, 58 and 60, to prevent leakage at the joint. The pipes, 60, reciprocate in curved guides, 63, in the cap, 21. This provides, as will readily be understood, for a constant circulation of water from the radiator, through the cap and one pair of telescoping pipes to the water jacket of the cylinder, and back through the other pair of telescoping pipes, and the cap to the radiator again.

The lower part of the radiator is divided into front and rear compartments by a vertical partition, 65; into the front compartment there extends a tubular extension, 66, of the central bore, 67, of the driving shaft, 6, which constitutes the outlet or return passage for the piston and shaft cooling system, the inlet consisting of four smaller bores, 68, arranged around the central bore, 67, in the driving shaft, and the tubular extensions, 69, of the same, each of said extensions being bent at its end, as shown in Fig. 11, to assist in taking up the water, as they revolve with the driving shaft. These bent ends extend into the rear compartment of the radiator. From each bore, 68, a radial bore, 70, extends through the shaft, into the adjacent eccentric piston, which is cored out, as shown in Fig. 10, to form an annular water jacket, 71, communicating, at one end, through a small opening, 72, with said bore, 70, and, at the other end, through a similar opening, 73, with radial passages, 74, in the shaft, which communicate with the central bore, 67. The hot water issuing from the eccentrics and driving shaft, through the extension, 66, into the front compartment of the radiator, rises over the partition, 65, and mixes with the cooled water before entering the extensions, 69, of the inlet bores, 68, leading to the internal jackets of the eccentrics.

In a four cylinder engine, such as iltrated and described, the pistons are set in pairs at 180 degrees apart on the driving shaft, the two inner pistons occupying the same relative position, and the two outer pistons being set at 180 degrees thereto. The firing of the cylinders, however, takes place in the order 1—3—4—2, any suitable timing mechanism being employed to control the spark plugs in that order.

As before noted, the bottom of the casing, 21, is shaped to the form of an oil reservoir, into which the corners of the cylinders dip as they oscillate. The end walls of the cylinders are provided with zig-zag passages, 75, leading to the faces on which the shoes, 14, slide, the oil creeping up said passages and lubricating said faces. The oil reservoir in the bottom of the casing, 21, is divided, between the cylinders, by partitions, 76, into pockets, so as to prevent the oil from running towards the front or rear, when the engine foundation is inclined for any reason, as when the vehicle on which it may be mounted is not on a level base. The rapid motion of the cylinders and pistons will cause an oil spray or mist to fill the casing, 21, for which reason the pipes, 50, surrounding the spark plugs and their wires, are provided. Any suitable means may be provided for lubricating the cylinder bosses, 10, and the valve shaft, 38, and, if necessary for packing the ports in the sleeve, 8, with which the ports in said bosses and shaft cooperate to control the admission to and exhaust from the cylinders.

It will be readily understood that the reciprocation of the curved pipes, 60, in the stationary curved pipes, 58, tends to carry the body of water contained therein along; that is to say, to cause a reciprocation or surging of the water in said pipes. The check valves, 59, prevent this by permitting movement of the column of water in the curved pipes in the direction in which it is required to move to furnish the desired circulation in the cylinder jackets, but preventing its retrograde movement, thus causing said curved pipe system to act as a pump to maintain the circulation.

One of the principal advantages of our invention consists in the fact that an engine of any desired and determined horse power, constructed in accordance therewith, will occupy considerably less space than an engine of the ordinary form, with a corresponding reduction of weight, such relative reductions being, as is well known, of special importance in the engines of motor vehicles, whether operating on land, water, or in the air.

Another important advantage of our invention is presented in the reduction, which it attains, of the number of working parts, particularly reciprocating parts, whereby the engine is not only less expensive as to cost of construction and maintenance in operative condition, but also the objectionable vibrations, and resultant wear of the working parts, are largely eliminated.

We claim as our invention and desire to secure by Letters Patent:—

1. In an internal combustion engine, the combination of a straight driving shaft; rectangular cylinders mounted to oscillate about an axis parallel to said shaft; a valve shaft rotatable about said axis to control the admission and exhaust of the motive fluid to and from said cylinders; disc pistons mounted eccentrically on the driving shaft, one within each cylinder, a yoke surrounding each piston and shoes carried by said yokes so as to slide on the walls of the cylinders.

2. In an internal combustion engine, the combination, with the frame, of a straight driving shaft journalled therein; rectangular cylinders guided to oscillate on said frame about an axis parallel to the driving shaft, and having circular bosses on their heads, fitting a bearing in the frame; admission and exhaust ports in said bosses and frame bearing; a valve shaft journalled in said bosses, and geared to the driving shaft; disc pistons mounted eccentrically on the driving shaft, one within each cylinder, a yoke surrounding each piston and shoes carried by said yokes so as to slide on the walls of the cylinders.

3. In an internal combustion engine, the combination, with a frame, of a straight driving shaft, journalled therein; cylinders guided to oscillate on said frame about an axis parallel to the driving shaft; means, rotatable about said axis, to control the admission to and exhaust from said cylinders; disc pistons, eccentrically mounted on the driving shaft, one within each cylinder; a strap yoke surrounding each disc; and diametrically opposite shoes, carried by each yoke, to slide on the walls of the cylinders.

4. In an internal combustion engine, the combination, with the frame, of cylinders guided thereon so as to oscillate about an axis above their closed ends, and having curved slots in their walls; a straight driving shaft, journalled in the frame, parallel to said axis, and passing through said slots; discs, eccentrically carried by said shaft, one within each cylinder; shoes, carried by said discs, and constituting, with said discs, the pistons; means, rotatable about said axis, to control the supply of motive fluid; and means to cool said cylinders, discs and driving shaft.

5. An internal combustion engine, comprising a frame; a driving shaft journalled in said frame; a sleeve fixed in said frame, parallel to said driving shaft; segmental guides, carried by said frame; a cylinder, slidably mounted on said guides and pivoted on said sleeve; an eccentric disc on said shaft, within said cylinders; a yoke on said disc; shoes carried by said yoke and sliding on opposite walls of said cylinder; and a valve shaft, journalled in said sleeve, and driven in time with said driving shaft.

6. An internal combustion engine, comprising a frame; a driving shaft journalled in said frame; a ported sleeve fixed in said frame, above and parallel to said driving shaft; a ported valve shaft, rotatably mounted in said sleeve, and operatively connected to said driving shaft; a rectangular cylinder, having a cylindrical extension rotatably mounted on said sleeve; and an eccentric, keyed on said driving shaft, within said cylinder, and having diametrically opposite shoes sliding on the walls of said cylinder, said cylindrical extension having ports which cooperate with the ports in said sleeve and valve shaft to control the admission to and exhaust from said cylinder.

7. An internal combustion engine, comprising a frame; a driving shaft journalled therein; a ported sleeve, fixedly carried by said frame, above and parallel to said driving shaft cylinders, having cylindrical extensions, rotatably fitting on said sleeve, and slots through which said driving shaft passes, said extensions also having ports; a ported valve shaft rotatably mounted within said sleeve; a disc, eccentrically mounted on said driving shaft, within each cylinder; and gear connections between the driving and valve shafts.

8. An internal combustiton engine, comprising a frame; a rectangular cylinder, mounted to oscillate thereon; a driving shaft, passing through slots in the side walls of said cylinder; a disc, eccentrically carried on said shaft within said cylinder; shoes carried on said disc to slide on the end walls of said cylinder; inlet and exhaust ports in said frame and cylinder; and a valve shaft, journalled in said frame, in the axis of oscillation of said cylinder, said valve shaft being driven from said driving shaft, and having inlet and outlet passages, cooperating with said ports.

9. An internal combustion engine, comprising a frame; a cylinder mounted to oscillate thereon; a driving shaft passing through said cylinder; a disc, eccentrically mounted on said shaft within said cylinder; a yoke on said disc; shoes carried by said yoke, to slide on opposite walls of said cylinder; ports in said frame and cylinder; and a valve shaft; journalled in the axis of oscillation of the cylinder, and having passages cooperating with said ports, said shafts being connected by gearing.

10. An internal combustion engine, comprising a frame; a cylinder mounted to oscillate thereon, and having curved slots in its walls; a driving shaft, journalled in the frame and passing through said slots; an eccentric disc on said shaft, within said cylinder; diametrically opposite shoes, carried by said disc, to slide on the walls of the cylinder; means to provide a circulation of cooling water through said driving shaft and eccentric disc; and a valve shaft, journalled in the axis of oscillation of said cylinder, and operatively connected to said driving shaft.

11. An internal combustion engine, comprising a frame; a cylinder, mounted to oscillate thereon; a shaft, passing through the wall of said cylinder; an eccentric on said shaft, within said cylinder; shoes, carried by said eccentric, and sliding in the wall of the cylinder; means to provide a circulation of cooling water through said frame, into the wall of said cylinder; and a valve shaft, mounted in the axis of oscillation of said cylinder, and driven from said first mentioned shaft.

12. An internal combustion engine, comprising oscillating cylinders of rectangular cross-section; a driving shaft, passing through slots in the sides of said cylinders; an eccentric disc, fast on said shaft within each cylinder; a yoke, surrounding said disc; shoes, carried by said yoke, and sliding on the ends of the cylinder; means, in the axis of oscillation of the cylinders, and connected with said driving shaft, to control the inlet and outlet of gas to and from said cylinders; and means to cause a circulation of cooling water through the walls of the cylinders and through said eccentric discs.

13. An internal combustion engine, comprising a frame; water jacketed cylinders, oscillatably mounted thereon; inlet and outlet water passages in said frame, on each side of the axis of oscillation of said cylinders; pipes curved concentrically with said axis, and connected to said passages and to said jackets respectively, the free ends of said pipes having a telescopic connection; a driving shaft, passing through the sides of said cylinders; and an eccentric disc, fast on said shaft within each cylinder.

14. An internal combustion engine, comprising oscillating restangular cylinders; a driving shaft, passing through the side walls of said cylinders; eccentric pistons, fast on said shaft, one within each cylinder; shoes on said pistons to slide on the end walls of said cylinders; means, in the axis of oscillation of the cylinders, to control the supply of gas thereto; and means to supply cooling water to said eccentric pistons and to said oscillating cylinders.

15. An internal combustion engine, comprising an oscillating cylinder; an eccentric piston therein; a rotary shaft on which said piston is mounted, said shaft passing through slots in the wall of said cylinder, said piston being hollow to form a water-circulating passage therein, said shaft having an inlet passage leading to one end of said piston passage, and an outlet passage leading from the other end thereof; and a radiator, divided into compartments with which said inlet and outlet shaft passages communicate respectively.

16. An internal combustion engine, comprising a frame, composed of two identical vertical members and a chambered cap secured thereon; a plurality of cylinders, guided for oscillation on said members, about an axis lying in the plane of the bottom of said cap, each cylinder having a cylindrical boss fitting a similar recess in the bottom of said cap, said bosses and recesses being provided with cooperating ports; a ported valve shaft, rotatably mounted in said bosses; a driving shaft, parallel to said bosses, and passing through slots in the walls of said cylinders; pistons on said driving shaft, within said cylinders, each piston comprising an eccentric disc and diametrically opposite shoes; and a train of reducing gears between said driving shaft and said valve shaft.

17. An internal combustion engine, comprising the combination, with a supporting frame, of cylinders mounted to oscillate thereon; an eccentric piston in each cylinder; a driving shaft journalled in said frame and carrying said pistons; a radiator into which the end of said driving shaft projects; said shaft containing water passages, and said pistons being hollow and connected to said passages; water connections from said radiator to said frame; and telescopic connections from said frame to said oscillating cylinders.

18. An internal combustion engine, comprising a frame; water jacketed cylinders, mounted to oscillate on said frame; a radiator; inlet and outlet connections therefrom to said frame; and telescopic connections between said frame and said cylinders, whereby a circulation of water is maintained in said water jackets.

19. An internal combustion engine, comprising oscillating cylinders having water jacketed walls; eccentric pistons in said cylinders, having internal water jackets; a radiator; connection therefrom, including telescoping pipes, to the cylinder jackets; and separate connections from said radiator to said pistons, whereby both cylinders and pistons are cooled.

20. An engine comprising a frame, a rectangular cylinder guided to oscillate thereon, a driving shaft passing through curved slots in the side walls of said cylinder, a rotary valve turning about the axis of oscillation of said cylinder, gearing connecting said valve and shaft, an eccentric disc fast on said shaft within said cylinder, a strap surrounding said disc, and shoes carried by said strap and sliding on the end walls of said cylinder.

THOMAS W. GRANNAN.
WILLIAM D. GRANNAN.

Witnesses:
EDWARD DOYLE, Jr.,
BERNARD A. ACKERMAN.